United States Patent [19]

Wieler

[11] Patent Number: 5,093,665
[45] Date of Patent: Mar. 3, 1992

[54] POINT TARGET FILTER

[75] Inventor: James G. Wieler, Medway, Mass.

[73] Assignee: Raytheon Company, Lexington, Mass.

[21] Appl. No.: 722,361

[22] Filed: Jun. 24, 1991

Related U.S. Application Data

[63] Continuation of Ser. No. 636,050, Dec. 31, 1990, abandoned.

[51] Int. Cl.$^5$ .................... G01S 13/95; G01S 7/292
[52] U.S. Cl. .................................... 342/26; 342/91; 342/93
[58] Field of Search ................. 342/26, 91, 93, 159

[56] References Cited

U.S. PATENT DOCUMENTS

| | | | |
|---|---|---|---|
| 4,023,165 | 5/1977 | Holt et al. | 342/26 |
| 4,528,565 | 7/1985 | Hauptmann | 342/91 |
| 4,713,664 | 12/1987 | Taylor, Jr. | 342/91 |

Primary Examiner—Gilberto Barrón, Jr.
Attorney, Agent, or Firm—Walter F. Dawson; Richard M. Sharkansky

[57] ABSTRACT

A method and apparatus of point target filtering in a weather radar system for eliminating point targets such as airplanes in real time. A one-dimensional filter is used that operates on a single radar dwell of data at a time. The filter searches for point targets in a reflectivity data field by looking for increases and decreases in the magnitude of the radar return. Each sample volume of the radar dwell is compared to adjacent sample volumes and the differences are tested against predetermined point target thresholds. The differences greater than such predetermined thresholds are flagged. After the entire radar dwell is processed, flagged point target data in the sample volumes are replaced with the data from the sample volume just before the point target which is not considered to part of the point target. The point target filter removes the point targets and the performance limiting contamination they represent to automatic weather data processing programs.

18 Claims, 4 Drawing Sheets

POINT TARGET FILTER

This application is a continuation of application Ser. No. 07/636,050 filed Dec. 31, 1990, now abandoned.

BACKGROUND OF THE INVENTION

This invention relates to weather radar systems and in particular to an apparatus and method for removing non-weather radar return from weather radar data resulting from both moving and stationary targets.

Recent weather radar systems comprise automatic detection programs for detecting severe weather events. Radar returns from sources such as aircraft, birds, automobiles and other moving objects such as radars and roof-top fans produce false alarms in the automatic detection programs which limit the weather radar performance. Stationary clutter not removed by Moving Target Indicator (MTI) clutter filtering may also be removed by a point target filter.

SUMMARY OF THE INVENTION

Accordingly, it is therefore an object of this invention to remove non-weather radar returns or point clutter from weather radar data without eliminating naturally occurring large gradients in the weather data returns.

It is an object of this invention to provide a filter to prevent transient targets from triggering false alarms in automatic weather detection programs.

It is a further object of this invention to compensate for the varying nature and wide dynamic range of weather radar returns and to match filter threshold criteria to the radar receiver characteristics such as the receiver IF matched filter response.

The objects are further accomplished by providing a method of point target filtering in a radar system comprising the steps of (a) storing radar data for each sample volume of a plurality of sample volumes of a radar dwell, (b) processing the radar data to determine a difference between a test sample volume of radar data and $\pm N$ adjacent sample volumes of radar data where N equals 1, 2 or 3 adjacent sample volumes, (c) comparing each of the processed sample volume differences to predetermined threshold levels for determining a point target, (d) setting a flag for identifying the sample volume differences in accordance with the threshold levels, (e) skipping to a next one of the sample volumes of the radar dwell that is not flagged and repeating steps (b), (c) and (d) until completing a last sample volume of the radar dwell, and (f) replacing the flagged sample volumes with last valid radar data.

The objects are further accomplished by providing a method of point target filtering in a radar system comprising the steps of, (a) storing radar return base data including reflectivity data for each sample volume of a plurality of sample volumes of a radar dwell, (b) processing said reflectivity data to determine a difference between a test sample volume of reflectivity data and $\pm N$ adjacent sample volumes of radar data where N equals 1, 2 or 3 adjacent sample volumes, (c) comparing each of the processed sample volume differences to predetermined threshold levels for determining a point target having a five sample volume difference, a three sample volume difference or a one sample volume difference, (d) setting a flag for identifying a larger one of the sample volume differences as a five sample volume, a three sample volume or a one sample volume when said differences exceed the threshold levels, (e) skipping to a next one of the sample volumes of the radar dwell that does not have the point target flag set and repeating steps (b), (c) and (d) until completing a last sample volume of the radar dwell, and (f) replacing the flagged sample volumes with last valid sample volume data for the base data, the last valid sample volume data not being within the point target. The step of storing the base data includes said reflectivity data, velocity data and spectrum width data. The step of comparing each of the processed sample volume differences to predetermined threshold levels comprises the threshold levels being selected to exceed a maximum gradient of desired radar returns, and are further selected to match radar receiver response characteristics to the point target.

The objects are further accomplished by providing a point target filter in a radar system comprising means for storing radar return base data including reflectivity data for each sample volume of a plurality of sample volumes of a radar dwell, means coupled to the storing means and a radar signal processing means for processing the reflectivity data to determine a difference between a test sample volume of the reflectivity data and $\pm N$ adjacent sample volumes of reflectivity data where N equals 1, 2 or 3 adjacent sample volumes, means for operating on the processed sample volume differences to compare said differences to predetermined threshold levels for flagging a point target as a five sample volume difference, a three sample volume difference or a one sample volume difference in accordance with the larger of the threshold levels met by the differences, the reflectivity data processing means further comprises means for determining the sample volume differences for each sample volume of the radar dwell not previously flagged as a point target and comparing the difference to the predetermined threshold levels for identifying each sample volume as the five, three or one sample volume difference point target, and means for replacing the flagged sample volume point target in the storing means with last valid sample volume data for the radar base data, the last valid sample volume data not being within the point target. The radar return base data includes the reflectivity data, velocity data and spectrum width data. The predetermined threshold levels are selected to exceed a maximum gradient of desired radar returns and to match radar receiver response characteristics to the point target.

BRIEF DESCRIPTION OF THE DRAWINGS

Other and further features and advantages of the invention will become apparent in connection with the accomprising drawings wherein.

DESCRIPTION OF THE PREFERRED EMBODIMENT

Figure 1:
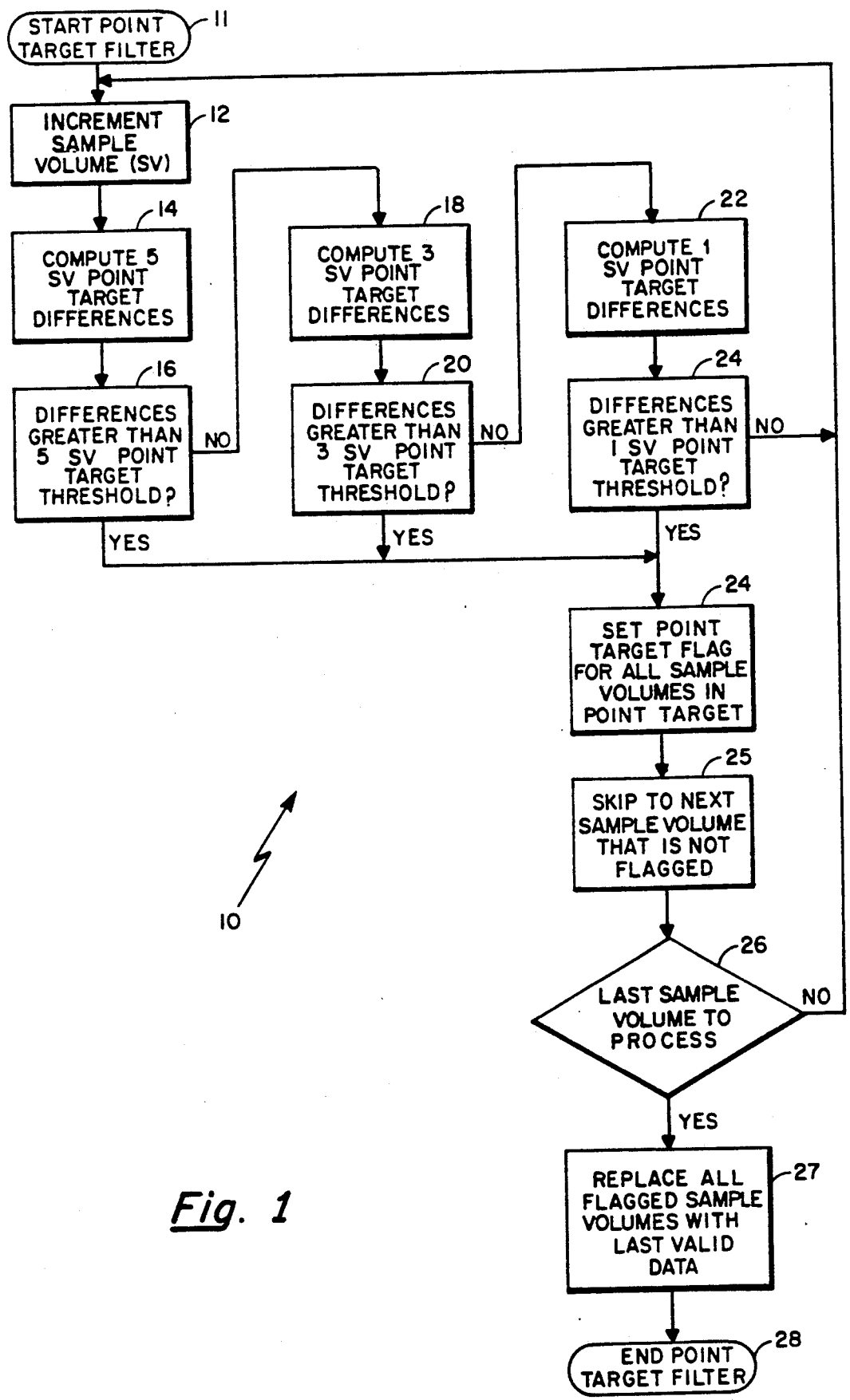
FIG. 1 is a flow chart of the present invention of a point target filter.
Figure 2:
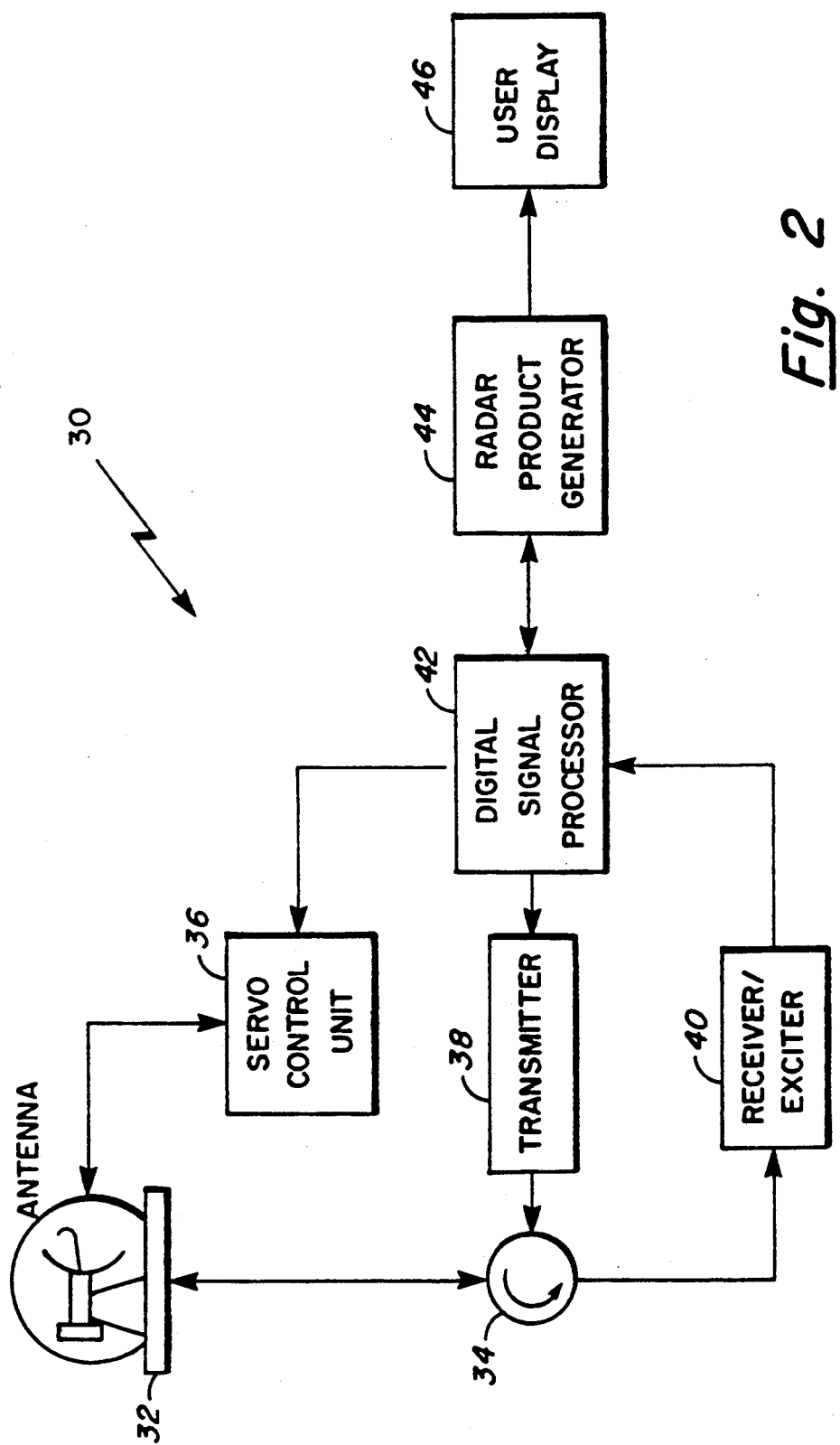
FIG. 2 is a block diagram of a weather radar system embodying the invention.

Referring to FIG. 1 and FIG. 2, FIG. 1 shows a flow chart of the present invention point target filter 10 for removing non-weather radar returns from Weather Radar data generated by a Weather Radar System 30.

FIG. 2 is a functional block diagram of such a Weather Radar System 30 employing the point target filter 10 in a Radar Product Generator 44. The point target filter 10 removes point targets without eliminating naturally occurring large gradients in the weather radar returns. It is assumed that weather radar returns are relatively continuous when observed with 150 meter radar sample volumes. This assumption allows weather returns to be separated from non-weather returns by utilizing a two sided filter, that is, a filter that looks for both an increase and decrease in the magnitude of the radar return. The point target filter 10 is one dimensional whereby it operates on a single radar dwell of data at a time. The point target filter 10 removes point targets and the performance limiting contamination they represent to automatic weather data processing programs.

The radar system 30 comprises a transmitter 38 and a Receiver/Exciter 40 which are coupled via a Duplexer 34 to a Narrow Beam Antenna 32 for transmitting signals to weather targets (precipitation size particles) and for receiving returned signals. The Servo Control Unit 36 is coupled between the Antenna 32 and a Digital Signal processor (DSP) 42. The Servo Control Unit 36 is used to control and report the positioning of the antenna 32; the DSP 42 forms the base data estimates from analog signals. A Radar Product Generator (RPG) 44 coupled to the output of the DSP 42 processes the base data to generate weather products which are coupled to a User Display 46. The User Display 46 displays the products produced by the RPG 44. The point target filter 10 operates in an array processor within the RPG 44. The RPG 44 receives zeroth and first moment data from the DSP 42, along with ancillary information such as time, azimuth, elevation, and pulse repetition frequency (PRF). The RPG 44 then produces the corresponding reflectivity, velocity, and spectrum width estimates. These estimates are commonly referred to as base data. Such base data is then processed by the point target filter 10. The point target filter 10 eliminates the problem of transient targets triggering false alarms in the automatic weather detection programs. Another data conditioning program comprising a method and apparatus for de-aliasing doppler velocity data in real time is described in U.S. patent application Ser. No. 491,770, (Allowed Dec. 18, 1990) by James G. Wieler and assigned to Raytheon Company.

The Antenna 32 of the Weather Radar System 30 transmits and receives data using a narrow beamwidth. This narrow beam is swept through the atmosphere at constant elevation angles for either 360 degrees or over sectors of interest. The data collected from the radar are integrated over one (1) degree, referred to as a radar dwell. After a complete elevation scan the antenna elevation angle is altered and the data collection is commenced at the new elevation angle. This process of data collection continues over the entire volume of interest. The Weather Radar System 30 completes this volumetric coverage once every five minutes. In order to complete the volumetric scanning sequence in the required time, it is necessary for the antenna to rotate at a rate of 30 degrees per second. The point target filter method of the present invention operates on 600 radar sample volumes in 33 milliseconds.

Figure 3:
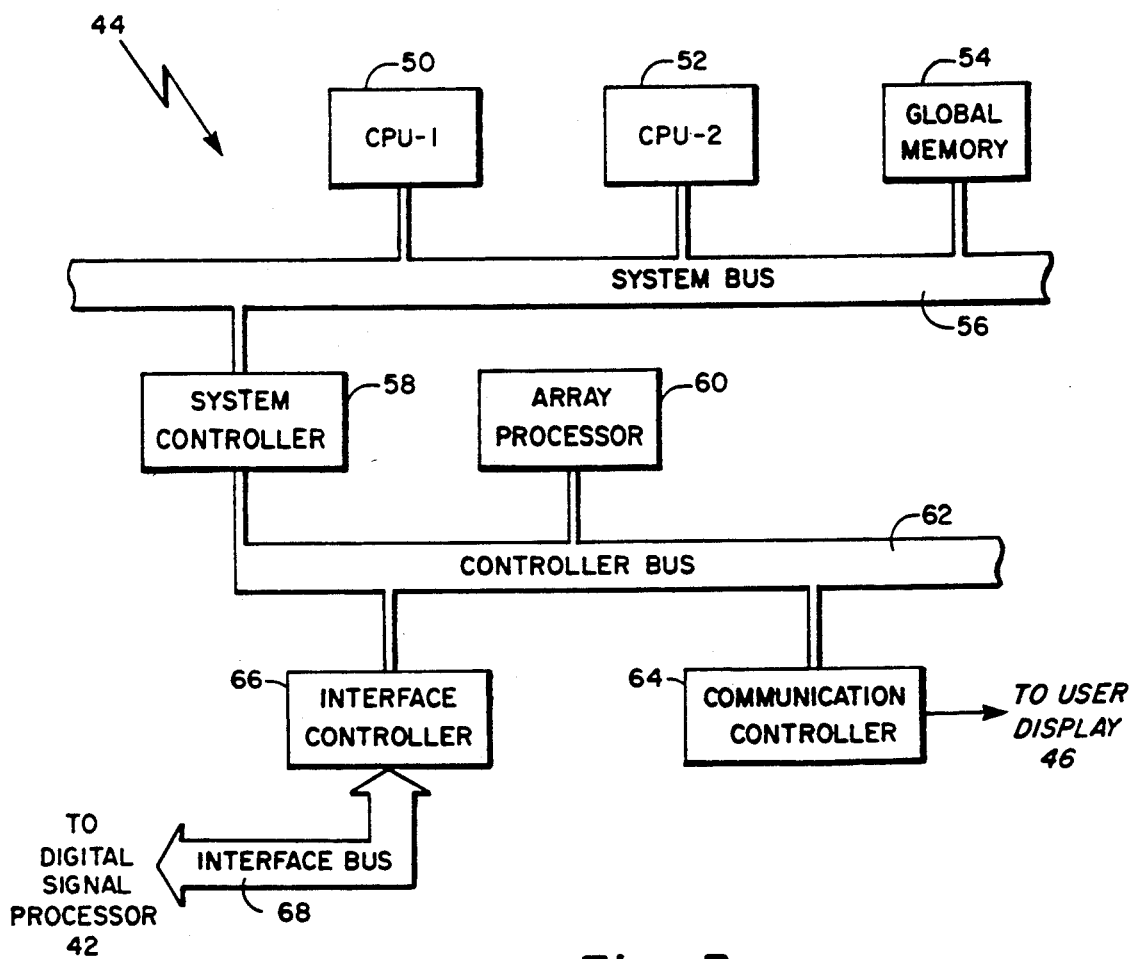
FIG. 3 is a block diagram of the radar product generator shown in FIG. 2.

Referring now to FIG. 3, a block diagram of the Radar Product Generator (RPG) 44 is shown comprising an Interface Controller 66 coupled to the Digital Signal Processor 42 by an Interface Bus 68 and a Communication Controller 64 which is coupled to the User Display 46. Within the RPG 44 a System Bus 56 interconnects a Central Processing Unit-1 (CPU-1) 50, a CPU-2 52, a Global Memory 54 and a System Controller 58. The System Controller 58 is also coupled to a Controller Bus 62 which interconnects the System Controller 58, an Array Processor 60, the Interface Controller 66 and the Communication Controller 64. The method of operating the point target filter primarily occurs between the Interface Controller 66, Array Processor 60, and the Global Memory 54. The Interface Controller 66 receives moment data from the Digital Signal Processor 42 and transfers this moment data to the Array Processor 60 where the point target filter 10 is applied. The weather data is stored in Global Memory 54 for further processing by the weather detection programs. Radar control parameters are generated in CPU-1 and outputted via the System Controller 58 to the Controller Bus 62 and then to the Communications Controller 64. The Interface Controller 66 sends the radar control parameters to the Digital Signal Processor 42 over the Interface Bus 68. Doppler velocity data is passed on to weather detection programs which transfer weather data from Global Memory 54 via the System Bus 56 to the System Controller 58; the data is then transferred from the System Controller 58 via Controller Bus 62 to the Communication Controller 64 which is coupled directly to the User Display 46.

The method of point target filtering in the present preferred embodiment is one dimensional, as it operates only on a single radar dwell at a time. However, for other weather radar applications such a filter may be multidimensional (e.g. azimuthal direction as well as radial direction) and also work on other data fields such as velocity and spectrum width. The point target filter 10 is applied to reflectivity data only in the present embodiment. When a point target is identified, all data such as reflectivity, velocity, and spectrum width from sample volumes (SV) included in the point target are replaced with data values from the last sample volume not considered to be part of the point target. Replacing data in the point target increases performance of the automatic weather detection algorithms and decreases the computational time taken in the exception handling needed to account for bad data points.

Referring again to FIG. 1, the point target filter 10 identifies point targets in the reflectivity field that exceed a five sample volume (SV) threshold, on a three sample volume (SV) threshold and on a one sample volume (SV) threshold. Such thresholds are selected to meet two criteria: first the thresholds exceed the maximum expected gradient for real weather returns, and second they should match the radar receiver characteristics. In a paper by E. Torlaschi and R. Humphries, "Statistics of Reflectivity Gradients", 21 Conference on Radar Meteorology, AMS, Boston, Mass., 1983, a study of summertime storms indicated that the mean reflectivity gradient is between 5 to 7 dB/Km. Hence, the thresholds have nominally been set to an order of magnitude greater than indicated by Torlaschi and Humphries. In addition, the thresholds also are in accordance with the receiver IF matched filter response. A non-weather target can look like a transient impulse to the radar system 30. When a large transient impulse is injected into the IF matched filter of the radar receiver 40, there is a transient response that takes a certain time to settle out. It is this transient response that governs the magnitude of the thresholds and the number of sample volumes that are used in the point target filter 10.

As shown in FIG. 1, the first step after starting the method of point target filtering is to increment to the next sample volume which becomes the next test sample volume. The next step is to compute a 5 sample volume point target differences 14 and then determine if the differences are greater than a 5 sample volume point target threshold 16. If the differences are not greater, then the next step is to compute a 3 sample volume point target differences 18. If the differences are greater, then the next step is to set a 5 sample volume point target flag 24. If the compute 3 sample volume point target differences 18 is performed, then the next step is to determine if the differences are greater than a 3 sample volume point target threshold 20, and if it is, to set a 3 sample volume point target flag 24. If the differences are not greater than the 3 sample volume point target threshold, then the next step is to compute a 1 sample volume point target difference 22 and then to determine if the differences are greater than a 1 sample volume point threshold 23; if it is greater, then the 1 sample volume point target flag 24 is set. If the 1 sample volume differences are not greater, then the next step is to test the next sample volume. Each time that the set point target flag 24 step is reached the following step is to skip to the next sample volume that is not flagged 25 and then test for a last sample volume to process 26. If not the last sample volume, then the method returns to the increment sample volume 12 step to continue the test process. If it is the last sample volume to process, then the next step is to replace all flagged sample volumes with last valid data 27 not part of the point target and place this data and corresponding flags in Global Memory 54 for use by other data processing functions; the point target filter method is completed.

Figure 4:
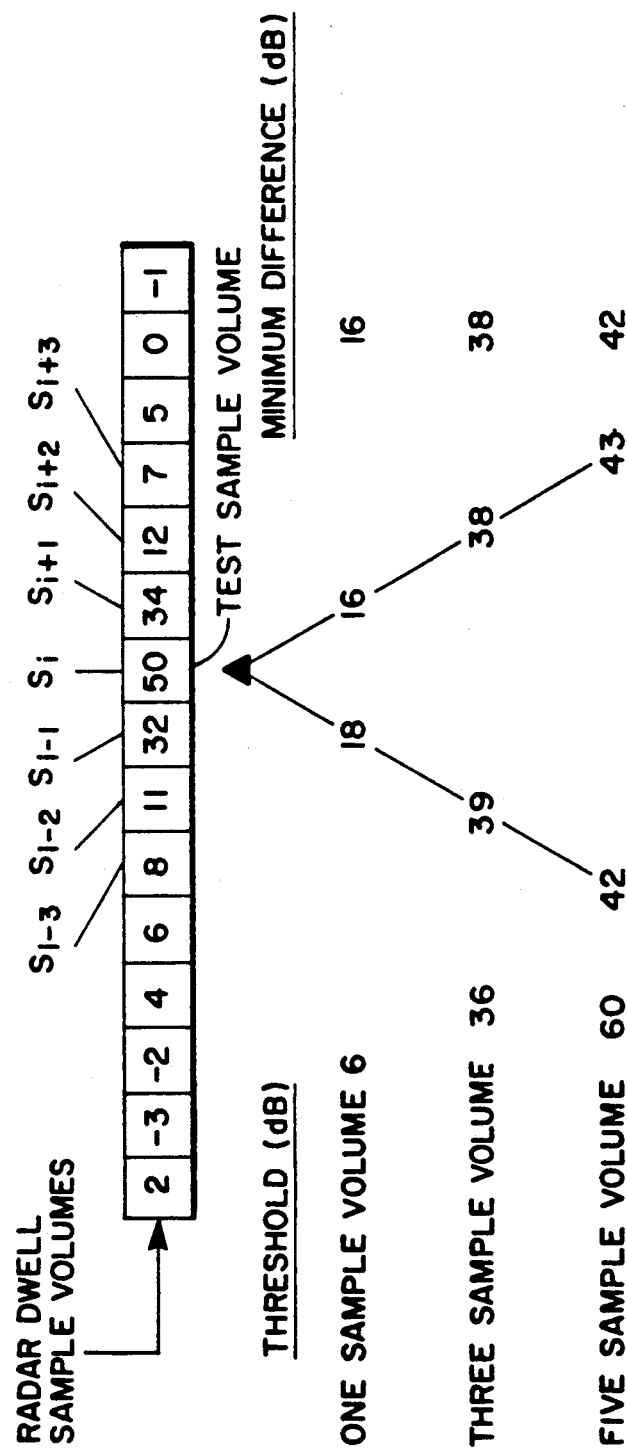
FIG. 4 illustrates a plurality of sample volumes of a radar dwell with reflectivity data and a test sample volume being evaluated for each of three thresholds.

Referring now to FIG. 4, a representation of a plurality of sample volumes of a radar dwell is shown with each sample volume having a reflectivity value, and an example of the point target filter operating on a test sample volume $S_i$ along the radar dwell is provided. Nominal values for the one sample volume, three sample volume and five sample volume thresholds are specified as 6, 36 and 60 dB respectively. Each sample volume of reflectivity data is compared to its $\pm N$ sample neighbors, where N is 1, 2 or 3 sample volume which test for 1, 3 and 5 sample volume point targets respectively. This data and the corresponding flags are then placed in Global Memory 54 for use by other data processing functions. When the reflectivity value of the current test sample volume is greater than both of the $\pm$neighbors by the corresponding threshold level, the current test sample volume is flagged as a 1, 3 or 5 sample volume point target depending on the highest threshold met. FIG. 4 shows the test sample volume being compared to neighboring sample volumes in the radar dwell and being evaluated for each of the three thresholds 6, 36 and 60 dB. If a threshold is met, then the test sample volume $S_i$ is flagged as a 1, 3 or 5 sample volume point target depending on the threshold level met and the method continues for the next sample volume adjacent to $S_i$. In this example, the test sample volume meets both the 1 sample volume and 3 sample volume thresholds, hence, it is flagged as a 3 sample volume point target. After all sample volumes along the radar dwell have been tested against the point target threshold criteria, a replacement process occurs wherein all flagged sample volumes (point targets) are replaced with last valid sample volume data for all products (reflectivity, velocity and spectrum width). Therefore, if a sample volume is flagged as a point target, then the appropriate number of sample volume (1, 3 or 5) centered on sample volume $S_i$ are replaced with the product value in the sample volume preceding the point target (i.e., $S_{i-1}$, $S_{i-2}$, or $S_{i-3}$ for 1, 3 and 5 sample volume point targets, respectively).

Attached hereto is an Appendix which comprises a Program Description Language (PDL) listing of the preferred embodiment of the invention for point target filtering in a Weather Radar System 30. The PDL presents a more detailed level of description of the method of the point target filtering. PDL is directly translated by one of ordinary skill in the art to a higher order programming language such as "C", Fortran or Ada.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

APPENDIX

```
/*************************************************************
 PURPOSE:    rb_Generate_point_target_removal Build the section of the array processor "chain" which
     handles the generation of edited base data.

ALGORITHMS:  This module implements the point target filter
 INTERRUPTS/
 SIGNALS:    N/A ASSUMPTIONS: This module assumes the calling module has
              verified that the scan generate edited base data
              flag indicates point target removal is to be
              performed for this elevation scan.

LIMITATIONS: None
```

ERROR HANDLING:

REMARKS:   Each time an aray processor instruction is added to the chain the count of the array processor instructions must be incremented.

```
*************************************************************/

/* BEGIN PDL
@
/*************************************************************
@       PDL
@
@       BEGIN
@         .
@         . build array processor chain to compute z(n) - z(n+3)
@           for each sample volume
@         . build array processor chain to clip z(n) - z(n+3) to
@           value of Five sample_volume threshold (keep sign)
@         . build array processor chain to multiply differences
@           for each side of potential point_target, if its a
@           point_target, result will be (Five sample_volume
@           threshold**2 )
@         . build array processor chain to add (Five sample_volume
@           threshold)**2 to result, so if point_target, set to 0
@         .
@         . build array processor chain to compute z(n) - z(n+2)
@           for each sample volume
@         . build array processor chain to clip z(n) - z(n+2) to
@           value of Three sample_volume threshold (keep sign)
@         . build array processor chain to multiply differences
@           for each side of potential point_target (if its a
@           point_target result will be (Three sample_volume
@           threshold)**2
@         . build array processor chain to add (Three sample_volume
@           threshold)**2 to result, so if point_target, set to 0
@         .
@         . build array processor chain to compute z(n) - z(n+1)
@           for each sample volume
@         . build array processor chain to clip z(n) - z(n+3) to
@           value of One sample_volume threshold (keep sign)
@         . build array processor chain to multiply differences
@           for each side of potential point_target (if its a
@           point_target result will be (One sample_volume
@           threshold)**2
@         . build array processor chain to add One sample_volume
@           threshold to result, so if point_target, set to 0
@         .
@         . set flags for all sample volumes in all point targets
@         .
@         . build array processor chain to treat 5 sample_volume
@           point_target as two 3 sample_volume
@             . point_targets (i.e ..5.. as .3.3.) and combine
@           with 3 sample_volume point_targets.
@         .
@         . build array processor chain to treat 3 sample_volume
@           point_target as two 1 sample_volume
@             . point_targets (i.e .3. as 1.1) and combine with 1
@           sample_volume point_targets.
@         .
```

```
@          . build array processor chain to fill in 3
@            sample_volume (1.1) cases (i.e. - 1.1 goes to 111)
@          .
@          . build array processor chain so all non point_targetd
@            data is set to one   (instead of non-zero)
@        , . build array processor chain to reverse point_target
@            flag so point_target = 1,  no point_target = 0
@          .
@          . build array processor chain to set first sample
@            volume of multi sample volume wide point_targets to the
@            previous value (for all base data)
@          .
@          . build array processor chain to set the remaining
@            point_targetd sample volumes to the value of the
@            previous, non-point_targeted sample volume
@          END
@
@
***********************************************************
    END PDL    */
```

What is claimed is:

1. A method of point target filtering in a radar system comprising the steps of:
    (a) storing radar data for each sample volume of a plurality of sample volumes;
    (b) processing said radar data to determine a difference between a test sample volume of radar data and ±N adjacent sample volumes of radar data where N equals an integer number of adjacent sample volumes;
    (c) comparing each of said processed sample volume differences to threshold levels for determining a point target;
    (d) setting a flag for identifying said sample volume differences in accordance with said threshold levels;
    (e) skipping to a next one of said sample volumes of said radar data that is not flagged and repeating steps (b), (c) and (d) until completing a last sample of said radar data; and
    (f) replacing said flagged sample volumes with last valid radar data.

2. A point target filter in a radar system comprising:
    means for storing radar data for each sample volume of a plurality of sample volumes;
    means coupled to said storing means and a radar signal processing means for processing said radar data to determine a difference between a test sample volume of radar data and ±N adjacent sample volumes of radar data where N equals an integer number of adjacent sample volumes;
    means for operating on said processed sample volume difference to compare said differences to threshold levels for flagging a point target in accordance with the larger of said threshold levels met by said differences;
    said data radar processing means further comprises means for determining said sample volume differences for each sample volume not previously flagged as a point target and comparing said differences to said thresholds levels for identifying said point target; and
    means for replacing aid flagged sample volume point targets in said storing means with last valid sample volume data for said radar data, said last valid sample value data not being within said point target.

3. A method of point target filtering in a radar system comprising the steps of:
    (a) storing radar return base data including reflectively data for each sample volume of a plurality of sample volumes;
    (b) processing said reflectivity data to determine a difference between a test sample volume of reflectivity data and ±N adjacent sample volumes of radar data where N equals an integer number of adjacent sample volumes;
    (c) comparing each of said processed sample volume differences to threshold levels for determining a point target having a five sample volume difference, a three sample volume difference or a one sample volume difference;
    (d) setting a flag for identifying a larger one of said sample volume differences as a five sample volume, a three sample volume or a one sample volume when said differences exceed said threshold levels;
    (e) skipping to a next one of said sample volumes of said radar data that does not have said point target flag set and repeating steps (b), (c) and (d) until completing a last sample volume of said radar data and
    (f) replacing said flagged sample volumes with last valid sample volume data for said base data, said last valid sample volume data not being within said point target.

4. The method as recited in claim 3 wherein said step of storing said base data includes said reflectivity data, velocity data and spectrum width data.

5. The method as recited in claim 3 wherein said step of comparing each of said processed sample volume differences to threshold levels comprises said threshold levels being selected to exceed a maximum gradient of desired radar returns.

6. The method as recited in claim 5 wherein said threshold levels are further selected to match radar receiver response characteristics to said point target.

7. A point target filter in a radar system comprising:

means for storing radar return base including reflectivity data for each sample volume of a plurality of sample volumes;

means coupled to said storing means and a radar signal processing means for processing said reflectivity data to determine a difference between a test sample volume of said reflectivity data and ±N adjacent sample volumes of reflectivity data where N equals an integer number of adjacent sample volumes;

means for operating on said processed sample volume differences to compare said differences to threshold levels for flagging a point target as a five sample volume difference, a three sample volume difference or a one sample volume difference in accordance with the larger of said threshold levels met by said differences;

said reflectivity data processing means further comprises means for determining said sample volume differences for each sample volume of said radar data not previously flagged as a point target and comparing said difference to said threshold levels for identifying each sample volume as said five, three or one sample volume difference point target; and means for replacing said flagged sample volume point target in said storing means with last valid sample volume data for said radar base data, said last valid sample volume data not being within said point target.

8. The point target filter as recited in claim 7 wherein:
said radar return base data includes said reflectivity data, velocity data and spectrum width data.

9. The point target filter as recited in claim 7 wherein:
said threshold levels are selected to exceed a maximum gradient of desired radar returns.

10. The point target filter as recited in claim 9 wherein:
said threshold levels are further selected to match radar receiver response characteristics to said point target.

11. The method of point target filtering as recited in claim 1 wherein:
said step of storing radar data comprises data from a radial direction.

12. The method of point target filtering as recited in claim 1 wherein:
said step of storing radar data comprises data from an azimuthal direction.

13. The point target filter as recited in claim 2 wherein:
said stored radar data comprises data from a radial direction.

14. The point target filter as recited in claim 2 wherein:
said stored radar data comprises data from an azimuthal direction.

15. The method of point target filtering as recited in claim 3 wherein:
said step of storing radar return base data comprises data from a radial direction.

16. The method of point target filtering as recited in claim 3 wherein:
said step of storing radar return base data comprises data from an azimuthal direction.

17. The point target filter as recited in claim 7 wherein:
said step of storing radar return base data comprises data from a radial direction.

18. The point target filter as recited in claim 7 herein:
said step of storing radar return base data comprises data from an azimuthal direction.

* * * * *